(12) United States Patent
Traynor et al.

(10) Patent No.: US 11,694,694 B2
(45) Date of Patent: Jul. 4, 2023

(54) DETECTING DEEP-FAKE AUDIO THROUGH VOCAL TRACT RECONSTRUCTION

(71) Applicant: University of Florida Research Foundation, Incorporated, Gainesville, FL (US)

(72) Inventors: Patrick G. Traynor, Gainesville, FL (US); Kevin Butler, Gainesville, FL (US); Logan E. Blue, Gainesville, FL (US); Luis Vargas, Gainesville, FL (US); Kevin S. Warren, Gainesville, FL (US); Hadi Abdullah, Gainesville, FL (US); Cassidy Gibson, Gainesville, FL (US); Jessica Nicole Odell, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 155 days.

(21) Appl. No.: 17/443,654

(22) Filed: Jul. 27, 2021

(65) Prior Publication Data
US 2022/0036904 A1    Feb. 3, 2022

Related U.S. Application Data

(60) Provisional application No. 63/058,853, filed on Jul. 30, 2020.

(51) Int. Cl.
*G10L 17/06*    (2013.01)
*G10L 17/26*    (2013.01)

(52) U.S. Cl.
CPC .............. *G10L 17/06* (2013.01); *G10L 17/26* (2013.01)

(58) Field of Classification Search
CPC ......... G10L 17/06; G10L 17/26; G10L 25/03; G10L 25/51
(Continued)

(56) References Cited

U.S. PATENT DOCUMENTS 5,799,276 A * 8/1998 Komissarchik ......... G10L 15/18
704/E15.005
5,907,824 A * 5/1999 Tzirkel-Hancock .... G10L 15/08
704/E15.014

(Continued)

OTHER PUBLICATIONS

Kirlin, R. Lynn. *A Posteriori Estimation of Vocal Tract Length.* IEEE Transactions on Acoustics, Speech, and Signal Processing vol. 26, No. 6, Dec. 1978, pp. 571-574.

(Continued)

*Primary Examiner* — Edwin S Leland, III
(74) *Attorney, Agent, or Firm* — Alston & Bird LLP

(57) ABSTRACT

A method is provided for identifying synthetic "deep-fake" audio samples versus organic audio samples. Methods may include: generating a model of a vocal tract using one or more organic audio samples from a user; identifying a set of bigram-feature pairs from the one or more audio samples; estimating the cross-sectional area of the vocal tract of the user when speaking the set of bigram-feature pairs; receiving a candidate audio sample; identifying bigram-feature pairs of the candidate audio sample that are in the set of bigram-feature pairs; calculating a cross-sectional area of a theoretical vocal tract of a user when speaking the identified bigram-feature pairs; and identifying the candidate audio sample as a deep-fake audio sample in response to the calculated cross-sectional area of the theoretical vocal tract of a user failing to correspond within a predetermined measure of the estimated cross sectional area of the vocal tract of the user.

20 Claims, 12 Drawing Sheets

(58) Field of Classification Search
USPC .......................................................... 704/243
See application file for complete search history.

(56) References Cited

U.S. PATENT DOCUMENTS

| | | | | | |
|---|---|---|---|---|---|
| 5,907,825 | A | * | 5/1999 | Tzirkel-Hancock | ........................ G10L 15/063 704/256.2 |
| 5,960,395 | A | * | 9/1999 | Tzirkel-Hancock | ........................ H04M 3/533 704/241 |
| 6,052,662 | A | * | 4/2000 | Hogden | .................. G10L 25/48 704/238 |
| 6,070,140 | A | * | 5/2000 | Tran | ........................ G06F 3/167 704/E15.045 |
| 6,133,904 | A | * | 10/2000 | Tzirkel-Hancock | .... G06F 3/167 345/157 |
| 6,502,073 | B1 | * | 12/2002 | Guan | .................. G10L 19/0018 704/235 |
| 7,376,556 | B2 | * | 5/2008 | Bennett | .................... G09B 5/04 704/E15.047 |
| 7,725,321 | B2 | * | 5/2010 | Bennett | ................. G06F 40/216 704/270.1 |
| 8,700,396 | B1 | * | 4/2014 | Mengibar | ............. G10L 15/063 704/235 |
| 11,176,960 | B2 | * | 11/2021 | Traynor | .................. G10L 15/22 |
| 2002/0116196 | A1 | * | 8/2002 | Tran | ...................... G06F 1/3203 704/E15.045 |
| 2004/0030556 | A1 | * | 2/2004 | Bennett | ................. G06F 40/289 704/E15.04 |
| 2004/0117189 | A1 | * | 6/2004 | Bennett | .................... G10L 15/30 704/E15.04 |
| 2006/0212296 | A1 | * | 9/2006 | Espy-Wilson | .......... G10L 15/08 704/254 |
| 2017/0301347 | A1 | * | 10/2017 | Fuhrman | ............... G10L 15/063 |
| 2019/0385591 | A1 | * | 12/2019 | Shin | ........................ G10L 15/28 |
| 2022/0036904 | A1 | * | 2/2022 | Traynor | .................. G10L 25/51 |
| 2022/0335947 | A1 | * | 10/2022 | Li | ............................ G10L 25/30 |
| 2023/0004830 | A1 | * | 1/2023 | Arevalo | ................... G06F 40/58 |

OTHER PUBLICATIONS

Todisco, Massimiliano et al. *ASVspoof 2019: Future Horizons in Spoofed and Fake Audio Detection*, Interspeech 2019, Sep. 15-19, pp. 1008-1012, Graz, Austria, DOI: 10.21437/Interspeech.2019-2249.

Lorenzo-Trueba, Jaime et al. 2018. *Can We Steal Your Vocal Identity From the Internet?: Initial Investigation of Cloning Obama's Voice Using GAN, WaveNet and Low-Quality Found Data*, arXiv preprint arXiv: 1803.00860 [eess.AS] Mar. 2, 2018.

Cao, Honglin Cao et al. *Correlations Between Body Heights and Formant Frequencies in Young Male Speakers: A Pilot Study*. The 9th International Symposium on Chinese Spoken Language Processing, Sep. 12, 2014, pp. 536-540, IEEE.

Alzantot, Moustafa et al. *Deep Residual Neural Networks for Audio Spoofing Detection*, Interspeech 2019, Sep. 15-19, 2019, pp. 1078-1082, Graz, Austria, DOI: 10.21437/Interspeech.2019-3174.

Wang, Chen. *Defeating Hidden Audio Channel Attacks on Voice Assistants Via Audio-Induced Surface Vibrations*, In Proceedings of the 35th Annual Computer Security Applications Conference, Dec. 9, 2019, pp. 42-56.

Albadawy Ehab A. et al. *Detecting AI-Synthesized Speech Using Bispectral Analysis*, In CVPR Workshops, Jun. 2019, pp. 104-109.

Liu, Yifan et al. *Es-Tacotron2: Multi-Task Tacotron 2 With Pre-Trained Estimated Network for Reducing the Over-Smoothness Problem*. Information, vol. 10, No. 4:131, Apr. 2019, (13 pages), DOI: 10.3390/info10040131.

Flego, Stefon. *Estimating Vocal Tract Length Minimizing Non-Uniformity of Cross-Sectional Area*, In Proceedings of Meetings on Acoustics 176ASA, vol. 35, No. 1: 060003, Nov. 5, 2018, pp. 1-9, Acoustical Society of America, DOI: 10.1121/2.0001000.

Wan, Li et al. *Generalized End-to-End Loss for Speaker Verification*, arXiv preprint arXiv:1710.10467v4 [eess.AS] Jan. 14, 2019, (5 pages).

Blue, Logan et al. *Hello, Is It Me You 're Looking for? Differentiating Between Human and Electronic Speakers for Voice Interface Security*, In Proceedings of the 11th ACM Conference on Security & Privacy in Wireless and Mobile Networks. ACM, Jun. 18, 2018, pp. 123-133, DOI: 10.1145/3212480.3212505.

Zhang, Zhaoyan. *Mechanics of Human Voice Production and Control*, The Journal of the Acoustical Society of America vol. 140, No. 4, Oct. 2016, pp. 2614-2635, DOI: 10.1121/1.4964509.

Wakita, Hisashi. *Normalization of Vowels by Vocal-Tract Length snd Its Application to Vowel Identification*, IEEE Transactions on Acoustics, Speech, and Signal Processing, vol. ASSP-25, No. 2, Apr. 1977, pp. 183-192.

Lammert, Adam C. Lammert et al. *On Short-Time Estimation of Vocal Tract Length From Formant Frequencies*, In PloS ONE, vol. 10, No. 7:e0132193, Jul. 15, 2015, pp. 1-23, DOI: 10.1371/journal.pone.0132193.

White, Andrew M. et al. *Phonotactic Reconstruction of Encrypted VoIP Conversations: Hookt on Fon-iks*, In 2011 IEEE Symposium on Security and Privacy, May 22, 2011, pp. 3-18, DOI: 10.1109/SP.2011.34.

Wang, Yao et al. *Secure Your Voice: An Oral Airflow-Based Continuous Liveness Detection for Voice Assistants*, Proceedings of the ACM on Interactive, Mobile, Wearable and Ubiquitous Technologies vol. 3, No. 4, Article No. 157, Dec. 2019, pp. 1-28, DOI: 10.1145/3369811.

Malik, Hafiz. *Securing Voice-Driven Interfaces Against Fake (Cloned) Audio Attacks*, In 2019 IEEE Conference on Multimedia Information Processing and Retrieval (MIPR), Mar. 28, 2019, pp. 512-517, DOI: 10.1109/MIPR.2019.00104.

Hansen, John H.L. et al. *Speaker Height Estimation From Speech: Fusing Spectral Regression and Statistical Acoustic Models*, The Journal of the Acoustical Society of America vol. 138, No. 2, Aug. 21, 2015, pp. 1052-1067, DOI: 10.1121/1.4927554.

Wang, Yuxuan et al. *Tacotron: Towards End-to-End Speech Synthesis*, arXiv preprint arXiv:1703.10135v2 [cs.CL] Apr. 6, 2017, (10 pages).

Povey, Daniel et al. *The Kaldi Speech Recognition Toolkit*, In IEEE 2011 Workshop on Automatic Speech Recognition and Understanding (Hilton Waikoloa Village, Big Island, Hawaii, US). IEEE Signal Processing Society. IEEE Catalog No. CFP11SRW-USB, (2011), (4 pages).

Hayden, Rebecca E, The Relative Frequency of Phonemes in General-American English. WORD, vol. 6, No. 3, (1950), (Published Online: Dec. 4, 2015), pp. 217-223, DOI: 10.1080/00437956.1950.11659381.

Jia, Ye et al. *Transfer Learning From Speaker Verification to Multispeaker Text-to-Speech Synthesis*, ArXiv preprint arXiv:1806.04558 [cs.CL] Jan. 2, 2019, (15 pages).

Waller, Sara Skoog et al. *Vocal Age Disguise: The Role of Fundamental Frequency and Speech Rate and Its Perceived Effects*. Frontiers in Psychology vol. 7, Article No. 1814, Nov. 21, 2016, pp. 1-10, DOI: 10.3389/fpsyg.2016.01814.

Wang, Qian et al. *VoicePop: A Pop Noise Based Anti-Spoofing System for Voice Authentication on Smartphones*, In IEEE INFOCOM 2019-IEEE Conference on Computer Communications, Apr. 29, 2019, pp. 2062-2070, IEEE.

Van Den Oord, Aaron et al. *WaveNet: A Generative Model for Raw Audio*, arXiv preprint arXiv:1609.03499 [cs.SD] Sep. 19, 2016, (15 pages).

Garofolo, John S. et al. *TIMIT Acoustic-Phonetic Continuous Speech Corpus*, LDC93S1, Web Download, Philadelphia: Linguistic Data Consortium, Feb. 1993, (84 pages), DOI: 10.35111/17gk-bn40.

Schafer, Ronald W. et al. *Digital Representations of Speech Signals*, In Proceedings of the IEEE, vol. 63, No. 4, Apr. 1975, pp. 662-679.

\* cited by examiner

| PHONEME TYPE | PHONEME | EXAMPLE |
|---|---|---|
| VOWEL | /I/ | SH<u>I</u>P |
| FRICATIVE | /s/ | <u>S</u>UN |
| STOP | /g/ | <u>G</u>ATE |
| AFFRICATIVE | /tʃ/ | <u>CH</u>URCH |
| NASAL | /n/ | <u>N</u>ICE |
| GLIDE | /l/ | <u>L</u>IE |
| DIPTHONG | /eI/ | W<u>AI</u>T |

FIG. 2

DETECTING DEEP-FAKE AUDIO THROUGH VOCAL TRACT RECONSTRUCTION

CROSS-REFERENCE TO RELATED APPLICATIONS

This application claims priority to U.S. Provisional Patent Application Ser. No. 63/058,853, filed on Jul. 30, 2020, the contents of which are hereby incorporated by reference in their entirety.

GOVERNMENT FUNDING

This invention was made with government support under 1933208 awarded by the National Science Foundation and 1562485 awarded by the National Science Foundation. The government has certain rights to the invention.

TECHNOLOGICAL FIELD

An example embodiment of the present disclosure relates to distinguishing between organic audio produced by a person and synthetic "deep-fake" audio produced digitally, and more particularly, to modeling the dimensions of a vocal tract based at least in part on an audio sample to establish if the audio sample was organically or synthetically produced.

BACKGROUND

The ability to generate synthetic human voices has long been a dream of scientists and engineers. Over the past 50 years, techniques have included comprehensive dictionaries of spoken words and formant synthesis models which can create new sounds through the combination of frequencies. While such techniques have made important progress, their outputs are generally considered robotic and easily distinguishable from organic speech. Recent advances in generative machine learning models have led to dramatic improvements in synthetic speech quality, with convincing voice reconstruction now available to groups including patients suffering from the loss of speech due to medical conditions and grieving family members of the recently deceased.

While a powerful and important enabler of communication for individuals who agree to use their voices in this fashion, such models also create significant problems for users who have not given their consent. Specifically, generative machine learning models now make it possible to create unauthorized synthetic voice files or "audio deep-fakes", which allow an adversary to simulate a targeted individual speaking arbitrary phrases. While public individuals have long been impersonated, such tools make impersonation scalable, putting the general population at a greater potential risk of having to defend itself against allegedly recorded remarks. In response, researchers have developed detection techniques using bi-spectral analysis (i.e., inconsistencies in the higher order correlations in audio) and training machine learning models as discriminators; however, both are highly dependent on specific, previously observed generation techniques to be effective.

BRIEF SUMMARY

A method, apparatus, and computer program product are provided in accordance with an example embodiment for distinguishing between organic audio produced by a person and synthetic audio produced digitally, and more particularly, to modeling the dimensions of a vocal tract based at least in part on an audio sample to establish if the audio sample was organically or synthetically produced. Embodiments include an apparatus having at least one processor and at least one memory including computer program code, the at least one memory and the computer program code configured to, with the processor, cause the apparatus to: generate a model of a vocal tract based at least in part on frequency response of one or more organic audio samples from a user; identify a set of bigram-feature pairs from the one or more audio samples; estimate, from the generated model of the vocal tract, the cross-sectional area of the vocal tract of the user when speaking the set of bigram-feature pairs; receive a candidate audio sample; identify bigram-feature pairs of the candidate audio sample that are in the set of bigram feature pairs; calculate a cross-sectional area of a theoretical vocal tract of a user when speaking the identified bigram-feature pairs of the candidate audio sample; and identify the candidate audio sample as a deep-fake audio sample in response to the calculated cross-sectional area of the theoretical vocal tract of a user when speaking the identified bigram-feature pairs of the candidate audio sample failing to correspond within a predefined measure of the estimated cross-sectional area of the vocal tract of the user when speaking the set of bigram-feature pairs.

The apparatus of an example embodiment may be further caused to: identify the candidate audio sample as an organic audio sample in response to the calculated cross-sectional area of the theoretical vocal tract of a user when speaking the identified bigram-feature pairs of the candidate audio sample corresponding within a predefined measure of the estimated cross-sectional area of the vocal tract of the user when speaking the set of bigram-feature pairs. Causing the apparatus of some embodiments to identify a set of bigram-feature pairs from the one or more audio samples may include causing the apparatus to identify bigram-feature pairs based, at least in part, on an estimation of the cross-sectional area of a vocal tract of a user when speaking respective bigram-feature pairs.

According to an example embodiment, causing the apparatus to identify a set of bigram-feature pairs from the one or more audio samples may include causing the apparatus to identify a set of bigram-feature pairs based, at least in part, on divergences in distributions of features in specific bigrams between deep-fake audio and organic audio. Divergences in distributions of features in specific bigrams between deep-fake audio and organic audio may be established based at least in part on a degree of overlap between probability density functions of the specific bigrams for deep-fake audio samples and organic audio samples. Causing the apparatus of some embodiments to generate the model of the vocal tract based at least in part on frequency response of one or more organic audio samples from a user may include causing the apparatus to process the one or more organic audio samples through a Fast Fourier Transform to obtain relative amplitudes for frequencies of a voice of the user. Causing the apparatus of some embodiments to identify the candidate audio sample as a deep-fake audio sample may include causing the apparatus to provide an explanation of how the candidate audio sample was identified as a deep-fake audio sample.

Embodiments provided herein may include a method including: generating a model of a vocal tract based at least in part on frequency response of one or more organic audio samples from a user; identifying a set of bigram-feature pairs from the one or more audio samples; estimating, from the generated model of the vocal tract, the cross-sectional area of the vocal tract of the user when speaking the set of bigram-feature pairs; receiving a candidate audio sample; identifying bigram-feature pairs of the candidate audio sample that are in the set of bigram-feature pairs; calculating a cross-sectional area of a theoretical vocal tract of a user when speaking the identified bigram-feature pairs of the candidate audio sample; and identifying the candidate audio sample as a deep-fake audio sample in response to the calculated cross-sectional area of the theoretical vocal tract of a user when speaking the identified bigram-feature pairs of the candidate audio sample failing to correspond within a predetermined measure of the estimated cross sectional area of the vocal tract of the user when speaking the set of bigram-feature pairs.

According to an example embodiment, the method may include identifying the candidate audio sample as an organic audio sample in response to the calculated cross-sectional area of the theoretical vocal tract of a user when speaking the identified bigram-feature pairs of the candidate audio sample corresponding within a predefined measure of the estimated cross-sectional area of the vocal tract of the user when speaking the set of bigram-feature pairs. Identifying a set of bigram-feature pairs from the one or more audio samples may include identifying bigram-feature pairs based, at least in part, on an estimation of the cross-sectional area of a vocal tract of a user when speaking respective bigram-feature pairs.

According to an example embodiment, identifying a set of bigram-feature pairs from the one or more audio samples may include identifying a set of bigram-feature pairs based, at least in part, on divergences in distributions of features in specific bigrams between deep-fake audio and organic audio. Divergences in distributions of features in specific bigrams between deep-fake audio and organic audio may be established based at least in part on a degree of overlap between probability density function graphs of the specific bigrams for deep-fake audio samples and organic audio samples. Generating the model of the vocal tract based at least in part on frequency response of one or more organic audio samples from a user may include processing the one or more organic audio samples through a Fast Fourier Transform to obtain relative amplitudes for frequencies of a voice of the user. Identifying the candidate audio sample as a deep-fake audio sample may include providing an explanation of how the candidate audio sample was identified as a deep-fake audio sample.

Embodiments provided herein include a computer program product including at least one non-transitory computer-readable storage medium having computer-executable program code portions stored therein, the computer-executable program code portions including program code instructions configured to: generate a model of a vocal tract based at least in part on a frequency response of one or more organic audio samples from a user; identify a set of bigram-feature pairs from the one or more audio samples; estimate, from the generated model of the vocal tract, the cross-sectional area of the vocal tract of the user when speaking the set of bigram-feature pairs; receive a candidate audio sample; identify bigram-feature pairs of the candidate audio sample that are in the set of bigram-feature pairs; calculate a cross-sectional area of a theoretical vocal tract of a user when speaking the identified bigram-feature pairs of the candidate audio sample; and identify the candidate audio sample as a deep-fake audio sample in response to the calculated cross-sectional area of the theoretical vocal tract of a user when speaking the identified bigram-feature pairs of the candidate audio sample failing to correspond within a predefined measure of the estimated cross-sectional area of the vocal tract of the user when speaking the set of bigram-feature pairs.

According to an example embodiment, the computer program product includes program code instructions to identify the candidate audio sample as an organic audio sample in response to the calculated cross-sectional area of the theoretical vocal tract of a user when speaking the identified bigram-feature pairs of the candidate audio sample corresponding within a predefined measure of the estimated cross-sectional area of the vocal tract of the user when speaking the set of bigram-feature pairs. The program code instructions to identify a set of bigram-feature pairs from the one or more audio samples includes, in some embodiments, program code instructions to identify bigram-feature pairs based, at least in part, on an estimation of the cross-sectional area of a vocal tract of a user when speaking respective bigram-feature pairs.

According to some embodiments, the program code instructions to identify a set of bigram-feature pairs of the one or more audio samples includes program code instructions to identify a set of bigram-feature pairs based, at least in part, on divergences in distributions of features in specific bigrams between deep-fake audio and organic audio. Divergences in distributions of features in specific bigrams between deep-fake audio and organic audio are established, in some embodiments, based at least in part on a degree of overlap between probability density function graphs of the specific bigrams for deep-fake audio samples and organic audio samples. The program code instructions to identify the candidate audio sample as a deep-fake audio sample optionally includes program code instructions to provide an explanation of how the candidate audio sample was identified as a deep-fake audio sample.

BRIEF DESCRIPTION OF THE DRAWINGS

Figure 1:
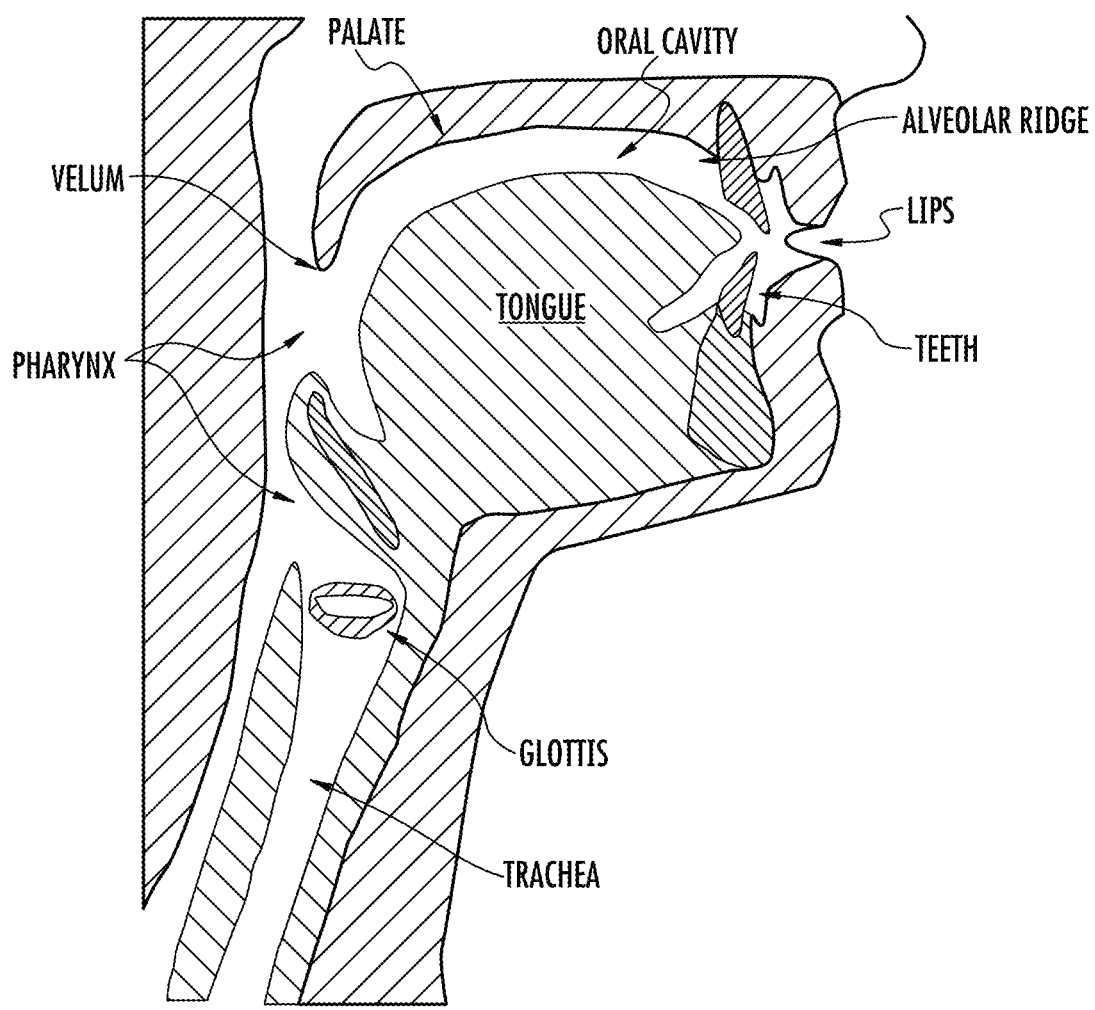
Figure 3:
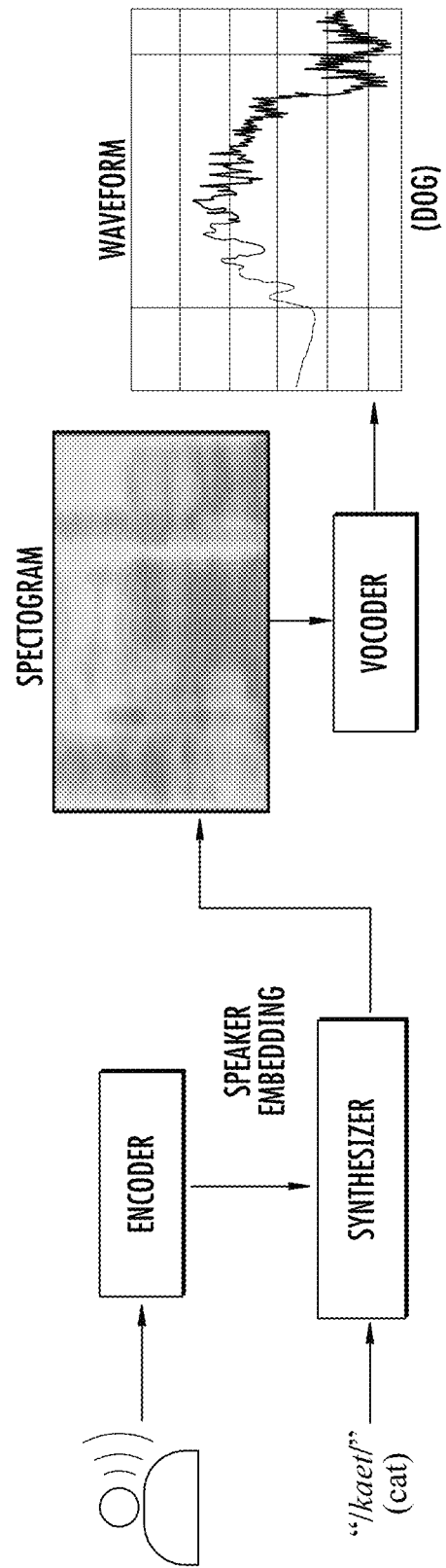
Figure 4:
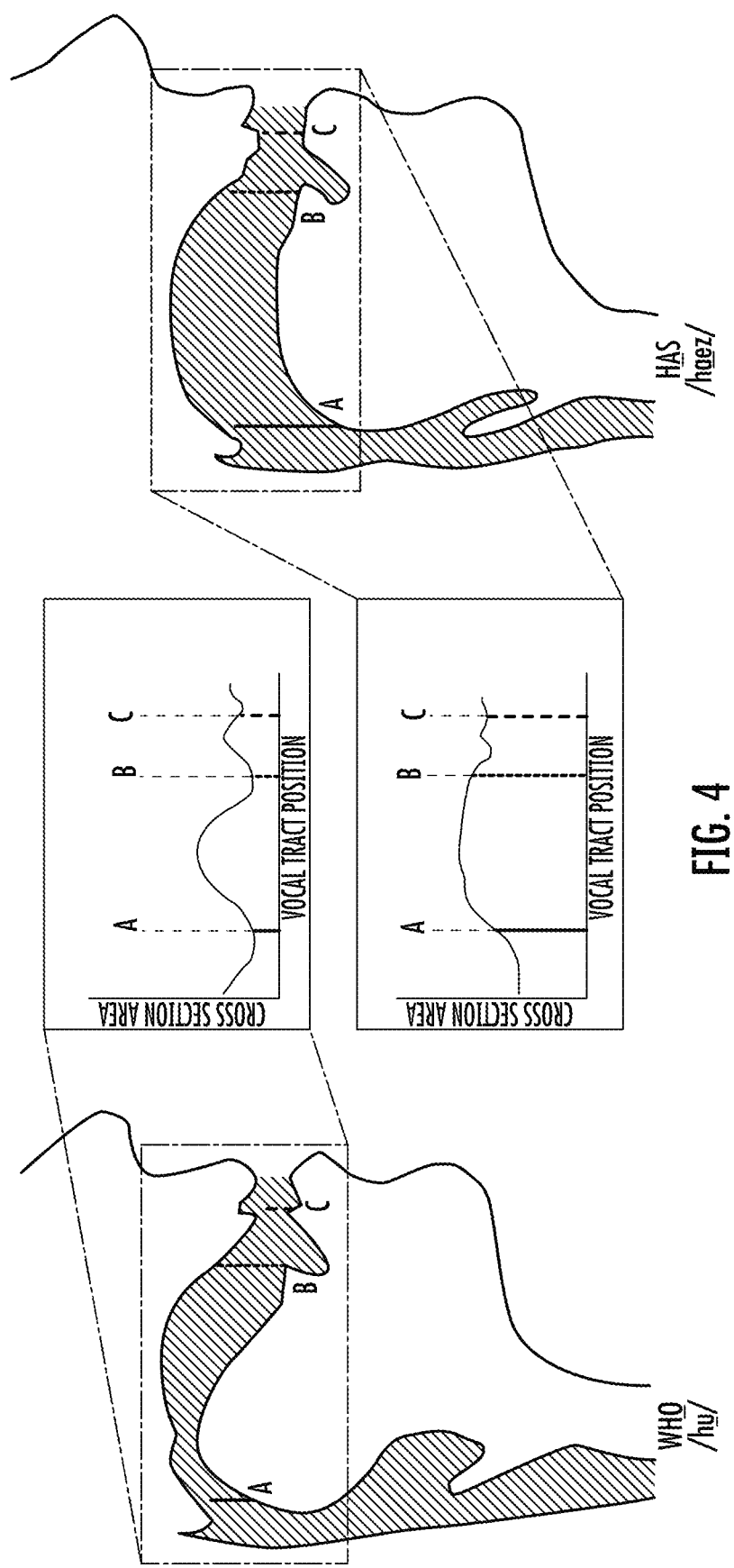
Figure 5:
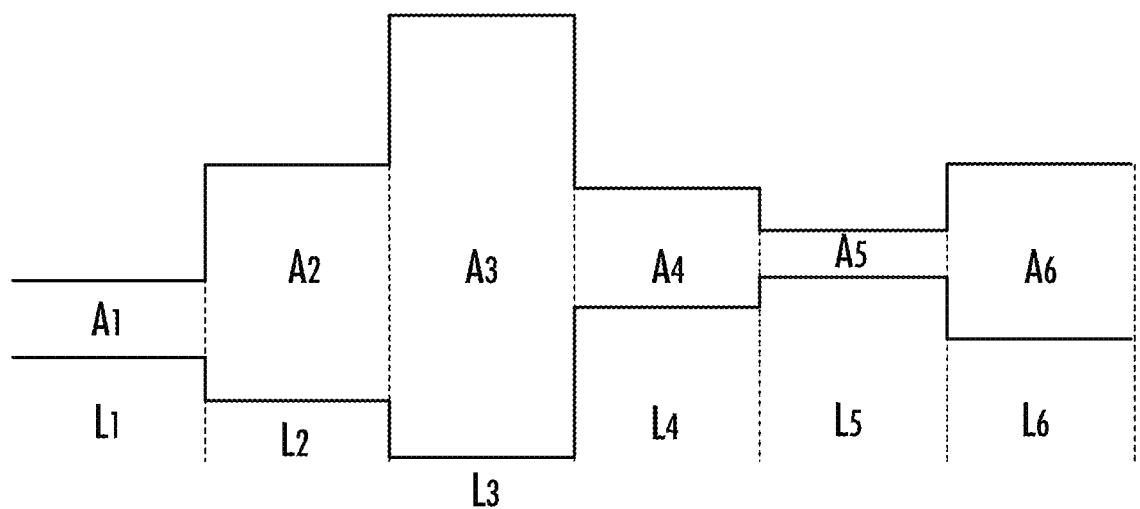
Figure 6:
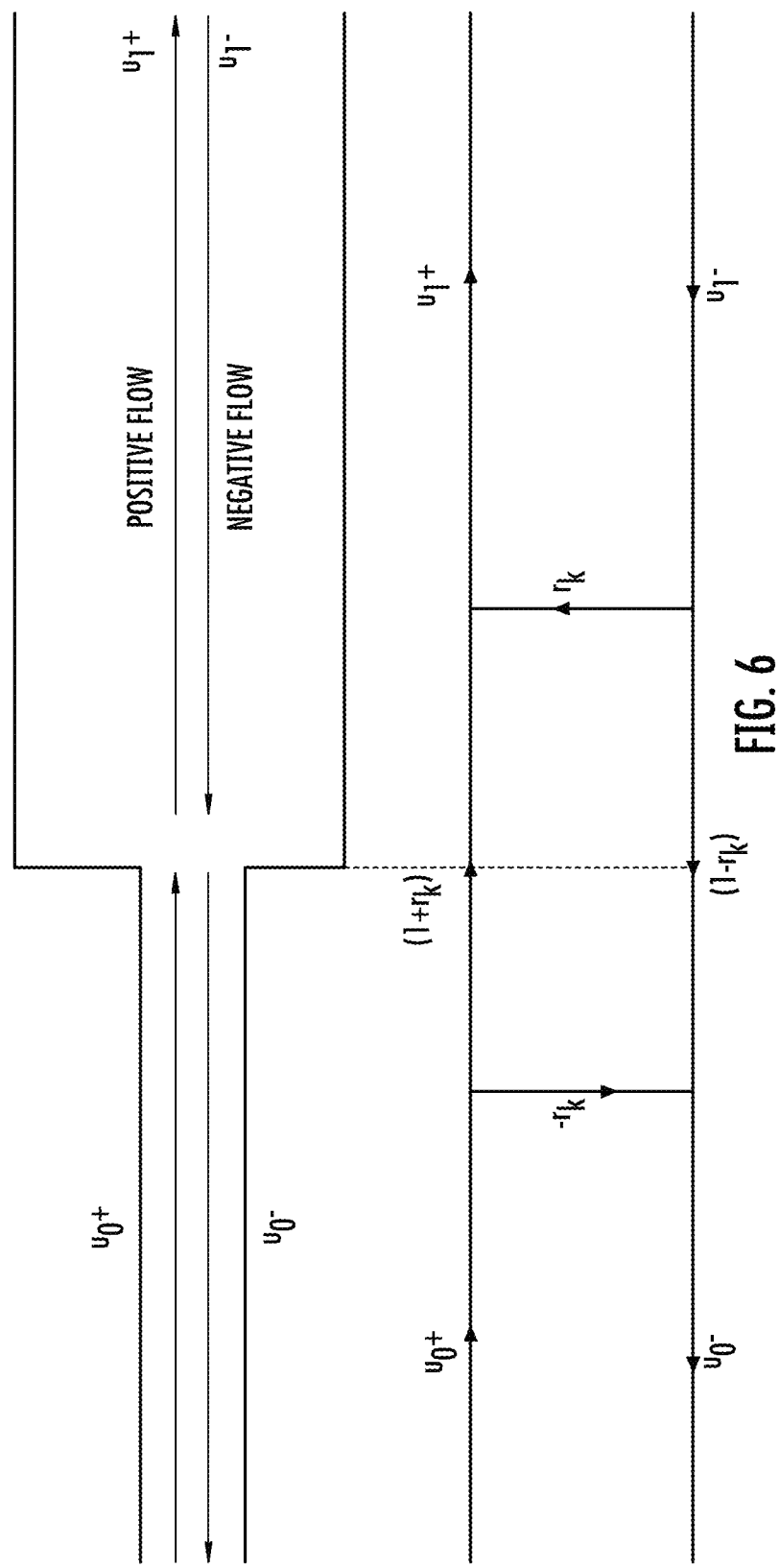
Figure 7:
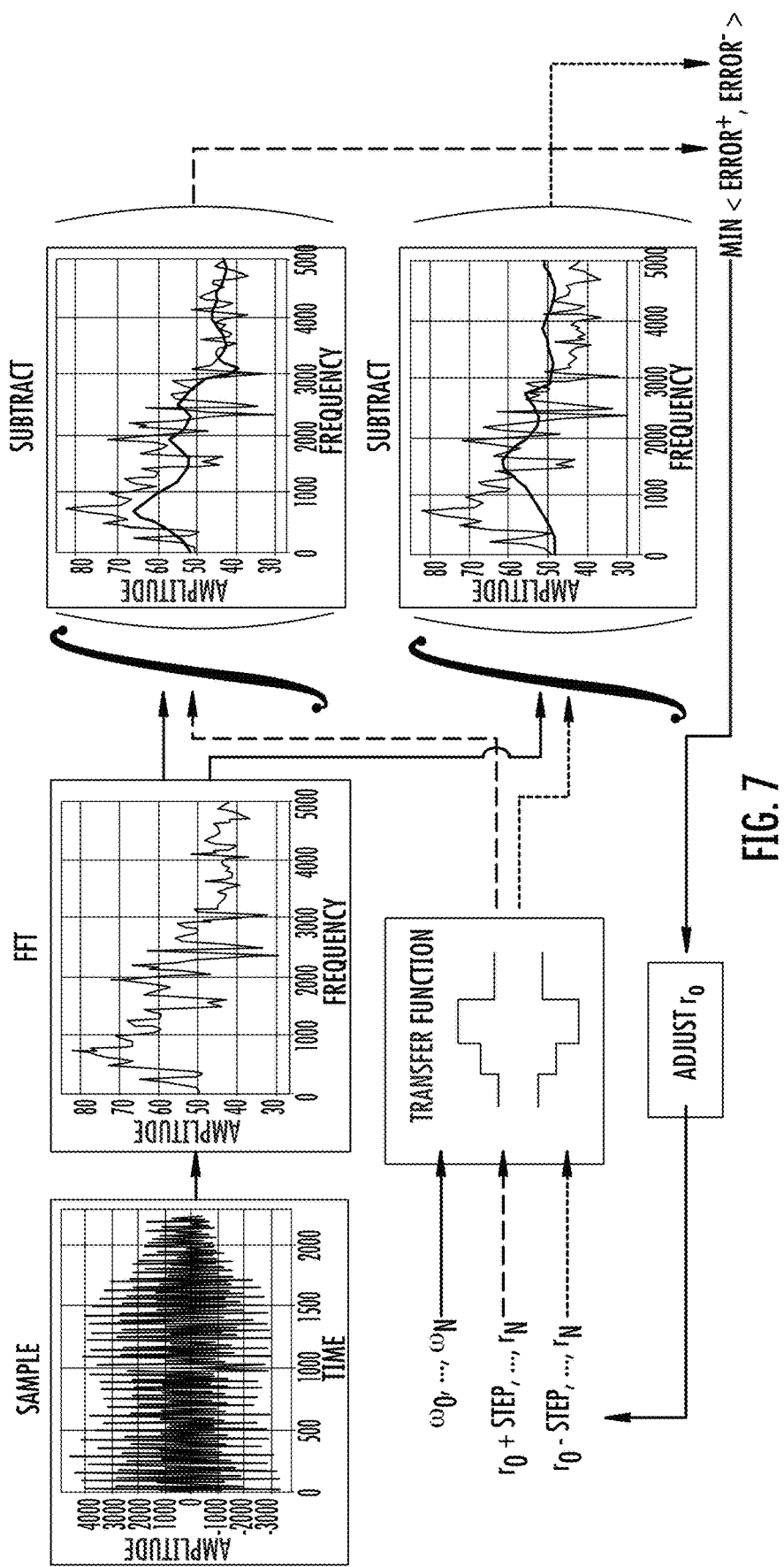
Figure 8:
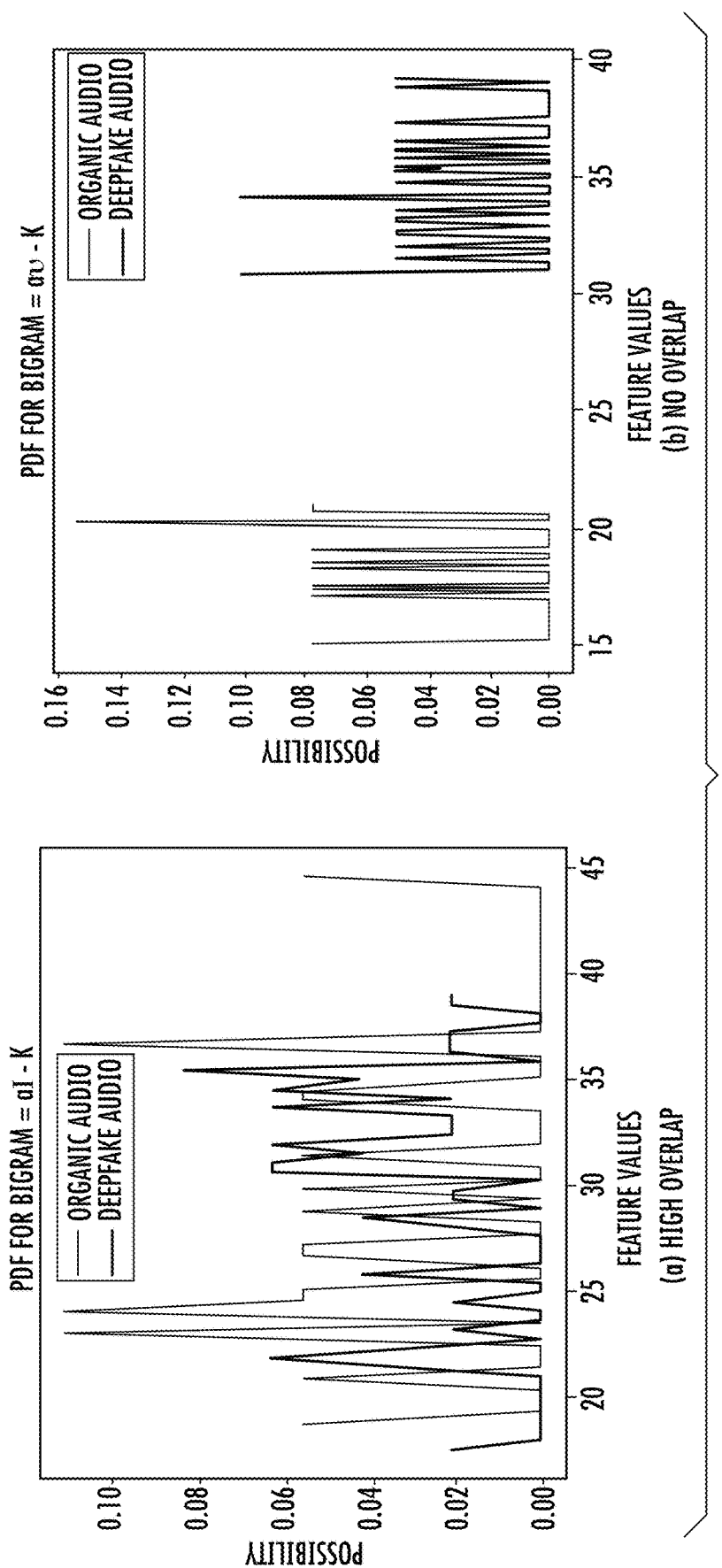
Figure 9:
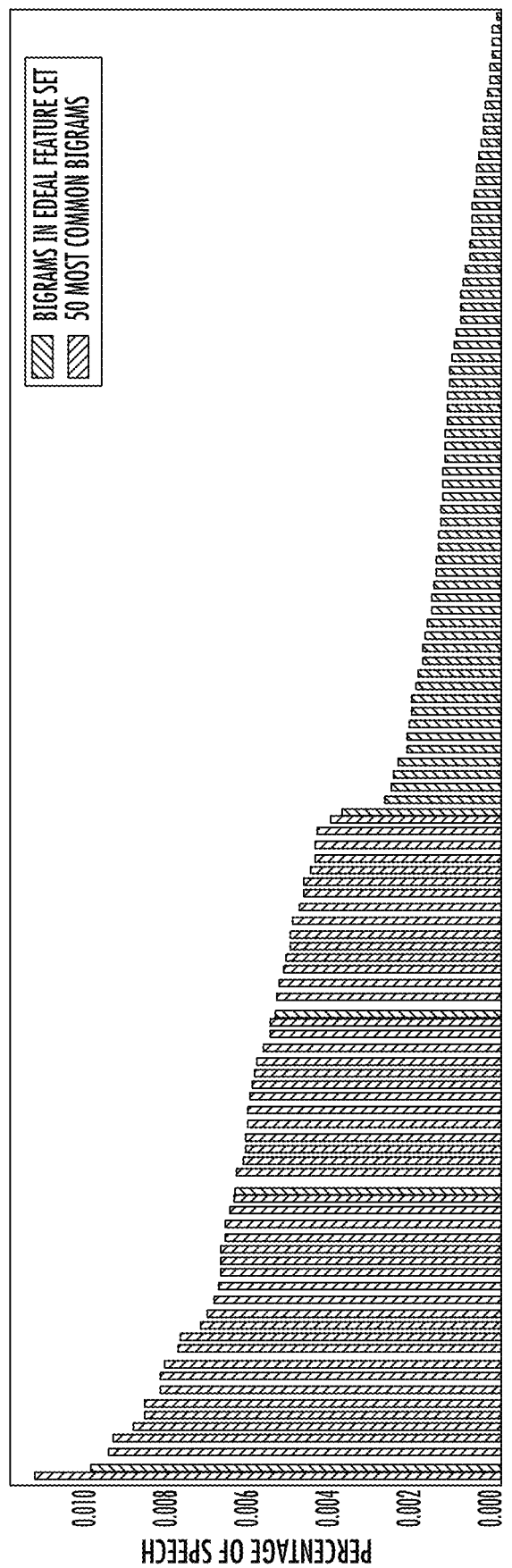
Figure 10:
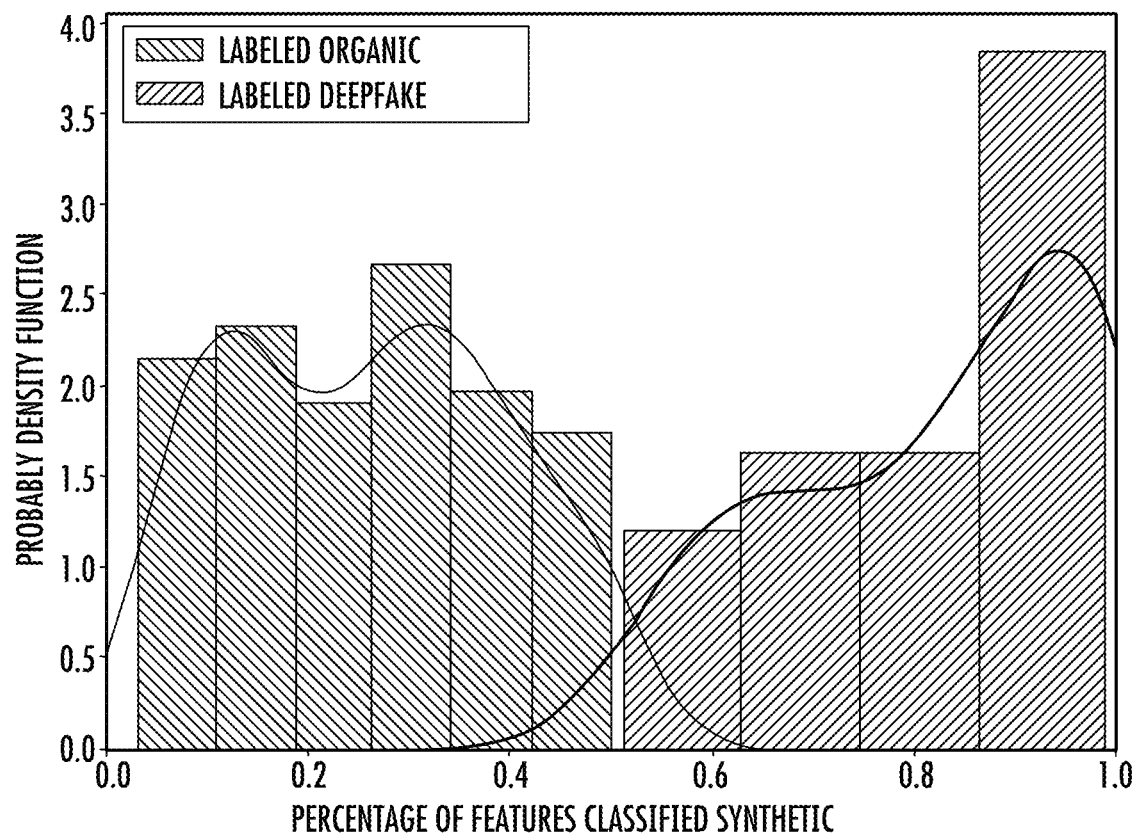
Figure 11:
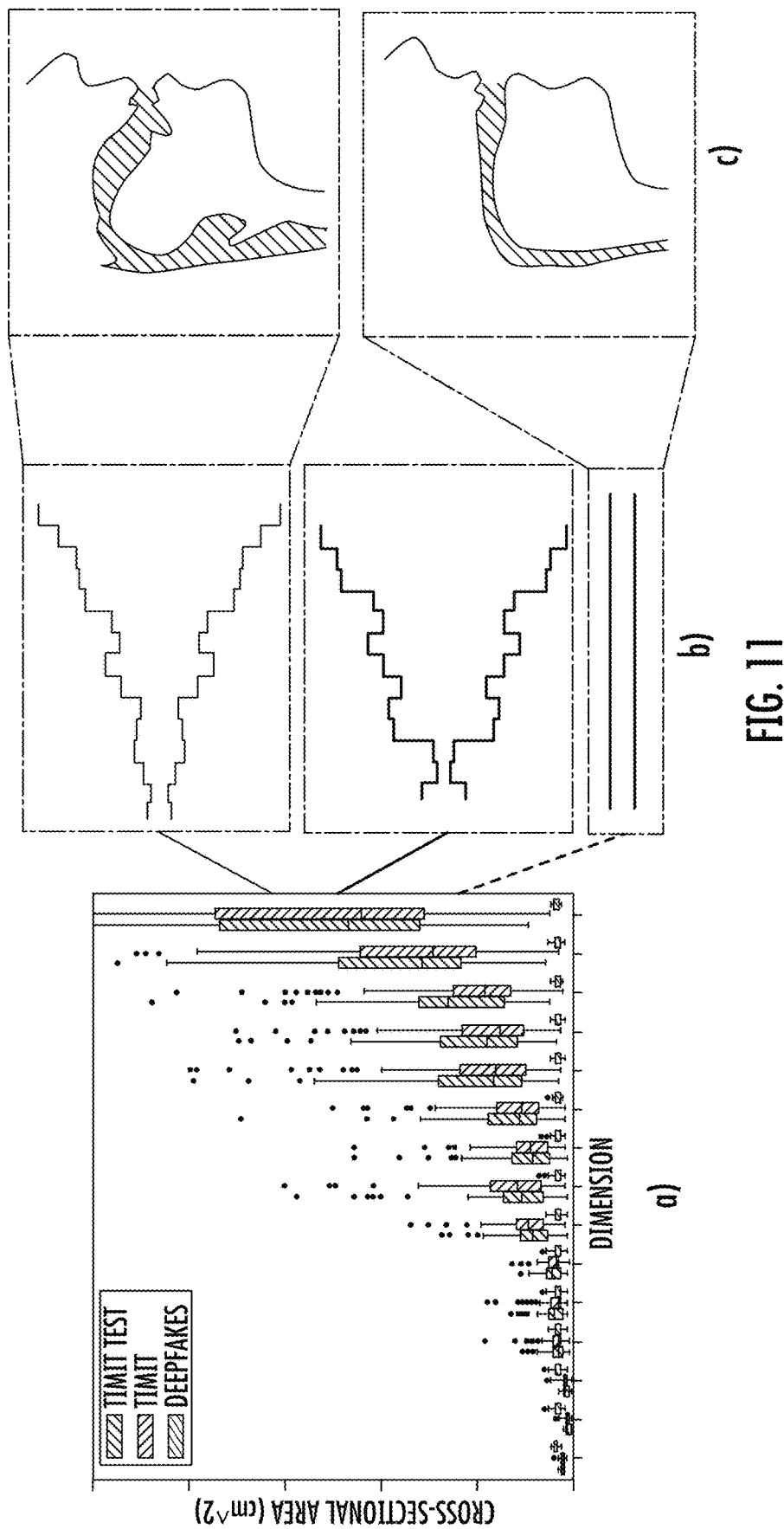
Figure 12:
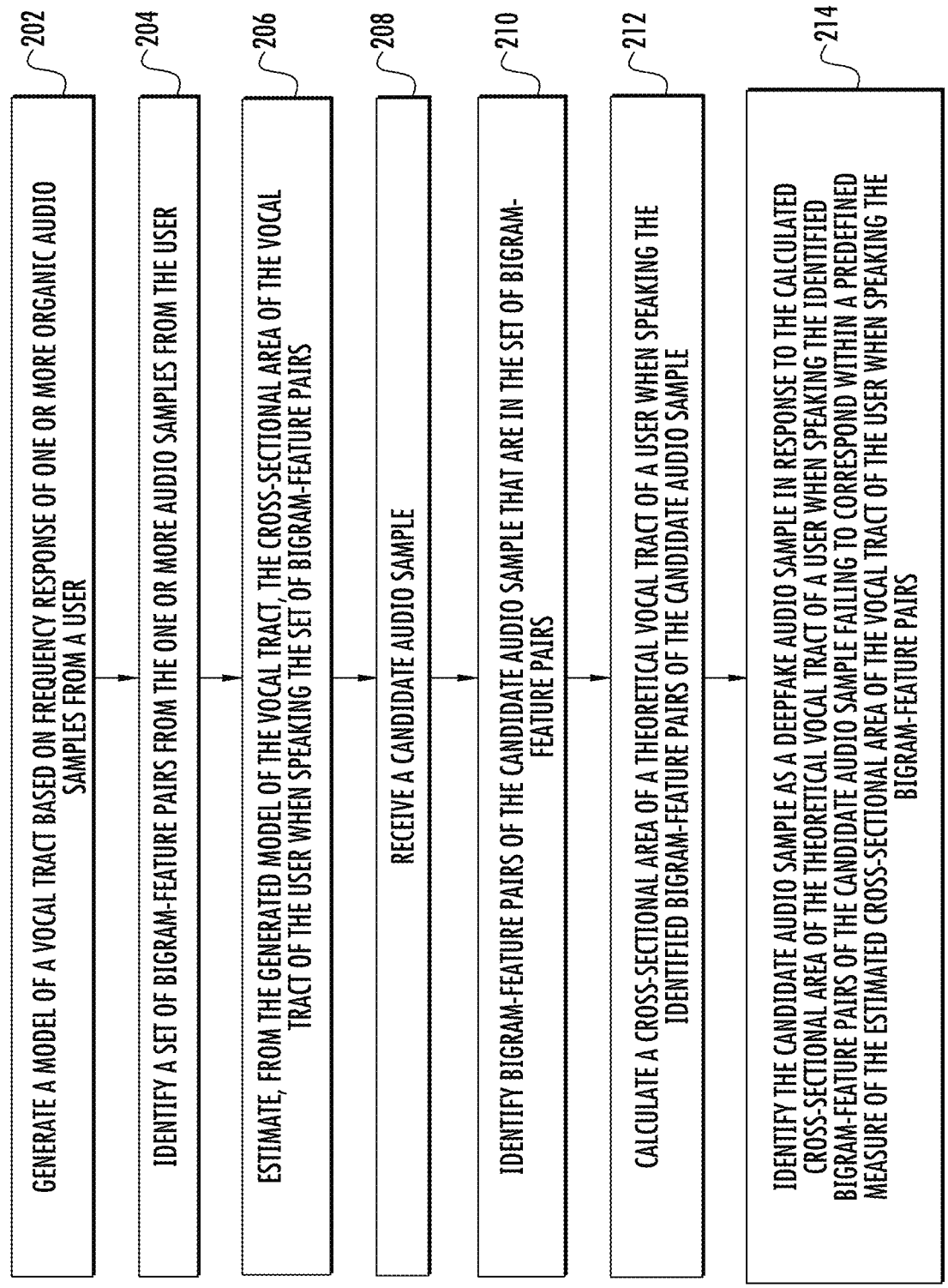

Having thus described example embodiments of the disclosure in general terms, reference will now be made to the accompanying drawings, which are not necessarily drawn to scale, and wherein:

FIG. 1 illustrates the portions of a persons vocal tract according to an example embodiment of the present disclosure;

FIG. 2 is a table of phoneme types including examples according to an example embodiment of the present disclosure;

FIG. 3 illustrates framework for creating deep-fake audio including three stages: an encoder, a synthesizer and a vocoder, according to an example embodiment of the present disclosure;

FIG. 4 illustrates the vocal tract position for three positions along the vocal tract when speaking two different phonemes according to an example embodiment of the present disclosure;

FIG. 5 illustrates a model of concatenated tubes representing a vocal tract according to an example embodiment of the present disclosure;

FIG. 6 is a schematic of the intersection between two tubes of a model of a vocal tract according to an example embodiment of the present disclosure;

FIG. 7 illustrates the process of estimating a speaker's vocal tract according to an example embodiment of the present disclosure;

FIG. 8 illustrates the probability density function plots for two bigrams with differing degrees of overlap between organic audio and deep-fake audio according to an example embodiment of the present disclosure;

FIG. 9 illustrates the bigrams found in an ideal feature set and the most common bigrams according to an example embodiment of the present disclosure;

FIG. 10 is a distribution plot depicting a percentage of features classified as deep-fakes per sentence according to an example embodiment of the present disclosure;

FIG. 11 illustrates cross-sectional area estimates output by a transfer function for a bigram according to an example embodiment of the present disclosure; and FIG. 12 is a flowchart of a method for identifying deep-fake audio according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Generative machine learning models have made convincing voice synthesis a reality. While such tools can be extremely useful in applications where people consent to their voices being cloned (e.g., patients losing the ability to speak, actors not wanting to have to redo dialog, etc.), they also allow for the creation of unconsented content known as "deep-fakes". This malicious audio is problematic not only because it can convincingly be used to impersonate arbitrary users, but because detecting deep-fakes is challenging and generally requires knowledge of the specific deep-fake generator. Embodiments of the present disclosure provide a mechanism for detecting audio deep-fakes using techniques from the field of articulatory phonetics. Specifically, embodiments apply fluid dynamics to estimate the arrangement of the human vocal tract during speech, and demonstrate that generated deep-fakes often model impossible or highly-unlikely anatomical arrangements. Embodiments described herein identify how deep-fake models fail to reproduce all aspects of speech equally. In so doing, embodiments demonstrate that subtle but biologically constrained aspects of how humans generate speech are not captured by current deep-fake audio generation models, and can therefore act as a powerful tool to detect audio deep-fakes.

Embodiments provided herein include techniques to detect deep-fake audio samples by solely relying on limitations of human speech that are the results of our biological constraints. Specifically, embodiments look to the field of articulatory phonetics to apply fluid dynamic models that estimate the arrangement of the human vocal tract during speech. The disclosed analysis demonstrates that deep-fake audio samples are not fundamentally constrained in this fashion, thus resulting in vocal tract arrangements that are subtly inconsistent with human anatomy. Embodiments demonstrate that this inconsistency is a reliable detector for deep-fake audio samples.

Using a combination of fluid dynamics and articulatory phonics, embodiments described herein identify the inconsistent behavior exhibited by synthesized or deep-faked audio samples (e.g., unnatural vocal tract diameters). Embodiments estimate the vocal tract during speech to prove such phenomena. Based at least in part on the identified phenomena, a deep-fake detector is constructed capable of detecting deep-faked audio samples with a precision of up to 100% and a recall of near 100%. The vocal tract features and portions of speech that cause deep-fakes to be detectable are analyzed such that the detector may only require a single sentence to detect a deep-fake with a true positive rate of more than 90%.

The lack of anatomical constraints are consistent across all deep-fake techniques. Without modeling the anatomy or forcing the model to operate within these constraints, the likelihood that a model will learn a biologically appropriate representation of speech is near zero. Thus, embodiments described herein drastically reduce the number of possible models that can theoretically evade detection.

The dangerous applications of deep-fake audio have spurred the need to automatically identify human audio samples from deep-fakes. Embodiments described herein extract the physical characteristics of a speaker from a given audio sample; these characteristics would otherwise not be present in deep-fake audio. Human or organic speech is created using a framework of muscles and ligaments around the vocal tract. The unique sound of each human voice is directly tied to the respective human anatomy. Based at least in part on voice samples of a speaker, dimensions of the speaker's anatomical structures such as their vocal tract length, age, or height can be estimated. An acoustical pipe configuration can be derived through modeling of the human pharynx. This model can then be used as a proxy for the human anatomy to retrieve the physical characteristics of the speaker. Since deep-fakes are generated using Generative Adversarial Networks (GANs), the physical dimensions associated with a deep-fake synthesized audio sample are inconsistent. This inconsistency can be measured and used to distinguish between deep-fake synthesized audio and human generated audio samples.

Phonemes are the fundamental building blocks of speech. Each unique phoneme sound is a result of different configurations of the vocal tract components shown in FIG. 1. Phonemes that comprise the English language are categorized into vowels, fricatives, stops, affricates, nasals, glides and diphthongs. The table of FIG. 2 illustrates the seven categories of phonemes. Their pronunciation is dependent upon the configuration of the various vocal tract components and the air flow through those vocal tract components.

Vowels (e.g., "/I/" in ship) are created using different arrangements of the tongue and jaw, which result in resonance chambers within the vocal tract. For a given vowel, these chambers produce frequencies known as formants whose relationship determines the actual sound. Vowels are the most commonly used phoneme type in the English language, making up approximately 38% of all phonemes. Fricatives (e.g., "/s/" in sun) are generated by turbulent flow caused by a constriction in the airway, while stops (e.g., "/g/" in gate) are created by briefly halting and then quickly releasing the air flow in the vocal tract. Affricatives (e.g., "/t ʃ /" in church) are a concatenation of a fricative with a stop. Nasals (e.g., "/n/" in nice) are created by forcing air through the nasal cavity and tend to be at a lower amplitude than the other phonemes. Glides (e.g., "/l/" in lie) act as a transition between different phonemes and diphthongs (e.g., "/eI/" in wait) refer to the vowel sound that comes from the lips and tongue transitioning between two different vowel positions.

Human audio production is the result of interactions between different components of the human anatomy. The lungs, larynx (i.e., the vocal chords), and the articulators (e.g., the tongue, cheeks, lips) work in conjunction to produce sound. The lungs force air through the vocal chords, inducing an acoustic resonance, which contains the fundamental (lowest) frequency of a speaker's voice. The resonating air then moves through the vocal cords and into the vocal tract. Here, different configurations of the articulators are used to shape the air in order to produce the unique sounds of each phoneme.

Deep-fakes are a digitally produced (synthesized) speech sample that is intended to sound like a specific individual. Currently, deep-fakes are often produced via the use of machine learning (ML) algorithms. While there are numerous deep-fake ML algorithms in existence, the overall framework the techniques are built on are similar. As shown in FIG. 3, the framework includes three stages: encoder, synthesizer and vocoder.

The encoder learns the unique representation of the speaker's voice, known as the speaker embedding. These can be learned using a model architecture similar to that of speaker verification systems. The embedding is derived from a short utterance using the target speaker's voice. The accuracy of the embedding can be increased by giving the encoder more utterances, with diminishing returns. The output embedding from the encoder stage is passed as an input into the following synthesizer stage.

A synthesizer generates a mel spectrogram from a given text and the speaker embedding. A mel spectrogram is a spectrogram that has its frequencies scaled using the mel scale, which is designed to model audio perception of the human ear. Some synthesizers are also able to produce spectrograms solely from a sequence of characters or phonemes.

The vocoder converts the mel spectrogram to retrieve the corresponding audio waveform. This newly generated audio waveform will ideally sound like a target individual uttering a specific sentence. A commonly used vocoder model is some variation of WaveNet, which uses a deep convolutional neural network that uses surrounding contextual information to generate its waveform. Although the landscape of audio generation tools is ever-changing, these three stages are the foundational components of the generation pipeline. The uniqueness of each tool is derived mainly from the quality of models (one for each stage) and the exact design of their system architecture.

Human created speech is fundamentally bound to the anatomical structures that are used to generate it. Only certain arrangements of the vocal tract are physically possible for a speaker to create. The number of possible acoustic models that can accurately reflect both the anatomy and the acoustic waveform of a speaker are limited. Alternatively, synthetic audio is not restricted by any physical structures during its generation. It is highly improbable that models used to generate synthetic audio will mimic an acoustic model that is inconsistent with that of an organic speaker. As such, synthetic audio can be detected by modeling the acoustic behavior of a speaker's vocal tract.

Deep-fake generation can be performed by a variety of entities, ranging from an authorized entity that is tasked with recreating speech of a person that can no longer speak, to those looking to harm an individual's character or sway a populous with speech appearing to come from a known individual in an unauthorized and damaging manner. Such unauthorized deep-fakes can be very powerful and considered highly valuable, such that an entity that creates a deep-fake may have access to substantial computing power to generate a highly-convincing deep-fake audio sample. The analysis and identification of a deep-fake synthesized audio sample may require an explanation as to why or how the audio sample was identified as a deep-fake in order to prove the audio was synthesized rather than organically generated. Embodiments described herein facilitate such detection and identification of deep-fake synthesized audio and can provide an explanation of such detection.

Embodiments described herein employ a training set of organic audio and a sample set of deep-fake audio samples generated by a deep-fake algorithm. The process of determining the source of an audio sample (e.g., organic vs. deep-fake) is then broken into two logical steps. First, a model of the speaker's vocal tract is constructed based at least in part on the amplitudes of certain frequencies (commonly referred to as the frequency response) present in their voice during a specific pair of adjacent phonemes (i.e., bigram). This model enables estimation of the cross-sectional area of the vocal tract at various points along the speaker's airway. Next, the ideal bigram-feature pairs are determined that discriminate between organic and deep-fake samples. By determining the cross-sectional areas of the speaker vocal tracts for each bigram and comparing the divergence of the deep-fake samples, the bigram-feature pairs that best determine the source of an audio sample can be isolated. The divergence of these ideal pairs are then compared in unseen audio to categorize them as organic or deep-fake.

To generate audible speech, a person moves air from the lungs to the mouth while passing through various components of the vocal tract. For example, the words "who" (phonetically spelled "/hu/") and "has" (phonetically spelled "/hæz/") have substantially different mouth positions during the pronunciation of each vowel phoneme (i.e., "/u/" in "who" and "/æ/" in "has"). FIG. 4 illustrates how some components of the vocal tract are arranged during the pronunciation of the vowel phonemes for each word mentioned above. During the pronunciation of the phoneme "/u/" in "who" the tongue compresses to the back of the mouth (i.e., away from the teeth) (A) at the same time the lower jaw is held predominately closed. The closed jaw position lifts the tongue so that it is closer to the roof of the mouth (B). Both of these movements create a specific pathway through which the air must flow as it leaves the mouth. Conversely, the vowel phoneme "/æ/" in "has" elongates the tongue into a more forward position (A) while the lower jaw distends, causing there to be more space between the tongue and the roof of the mouth. This tongue position results in a different path for the air to flow through, and thus creates a different sound. In addition to tongue and jaw movements, the position of the lips also differs for both phonemes. For "/u/", the lips round to create a smaller more circular opening (C). Alternatively, "/æ/" has the lips unrounded, leaving a larger, more elliptical opening. Just as the tongue and jaw position, the shape of the lips during speech impacts the sound created.

Another component that affects the sounds of phonemes is the other phonemes that are adjacent to it. For example, take the words "ball" (phonetically spelled "/bɔl/") and "thought" (phonetically spelled "/θɔt/"). Both words contain the phoneme "/ɔ/," however the "/ɔ/" in "thought" is effected by the adjacent phonemes differently than how "/ɔ/" in "ball" is. In particular "thought" ends with the plosive "/t/" which requires a break in airflow, thus causing the speaker to abruptly end the "/ɔ/" phoneme. In contrast, the "/ɔ/" in "ball" is followed by the lateral approximant "/l/," which does not require a break in airflow, leading the speaker to gradually transition between the two phonemes.

Vocal Tract Feature Estimator

Based at least in part on the above, the modeling technique of example embodiments needs to be able to extract the shape of the airway present during the articulation of a specific bigram. To do this, a fluid dynamic concatenated tube model is used to estimate the speaker's vocal tract. The model ignores energy losses that result from the fluid viscosity (i.e., the friction losses between molecules of the fluid), the elastic nature of the vocal tract (i.e., the cross-sectional area changing due to a change in internal pressure), and friction between the fluid and the walls of the vocal tract. Additionally, the walls of the vocal tract are assumed to have an infinitely high acoustic impedance (i.e., sound can only exit the speaker from their mouth). Overall, these assumptions simplify the modeling processing while marginally decreasing the accuracy of the technique. Within the model, it is assumed that only traveling waves along the centerline of the tube are heard. This assumption is sufficiently accurate for our model given the small diameter of tubes (i.e., vocal tract).

The concatenated tube model described herein includes a series of open pipe resonators that vary in diameters but share the same length. FIG. 5 is a simplified representation of this model. To estimate the acoustics of an individual tube at a specific time during a bigram, the behavior of pressure waves within the resonator needs to be understood. Modelling the net volumetric flow rate of the fluid (i.e., the air in the vocal tract) within the resonator provides an efficient mechanism. The acoustics of a resonator are modelled via the flow rate since the volumetric flow rate and the pressure (i.e., sound) within the resonator are directly related.

Modeling the interaction between two consecutive tubes is accomplished by balancing the volumetric inflows and outflows of the two tubes at their connection. Since the volumetric flow rate between two consecutive tubes must be equal, but the cross-sectional areas (and thus the volumes) do not, there may exist a difference in fluid pressure between them. This pressure difference at the boundary results in a reflection coefficient, which affects the fluid flow rates between the two tubes. A schematic of the intersection between two tubes can be seen in FIG. 6. Mathematically, the interactions between two consecutive pipes can be written as follows:

$$u_1^+ = u_0^+(1+r_k) + U_0^-(r_k) \quad (1)$$

$$u_0^- = u_1^-(1-r_k) + U_0^+(-r_k) \quad (2)$$

Where $u_0^+$ and $u_0^-$ is the forward and reverse volumetric flow rate in the left pipe, $u_0^+$ and $u_1^+$ is the forward and reverse volumetric flow in the right pipe, and $r_k$ is the reflection coefficient between the two consecutive pipes. Additionally, the reflection coefficient $r_k$ can be expressed as follows:

$$r_k = \frac{A_{k+1} - A_k}{A_{k+1} + A_k} \quad (3)$$

Where $A_{k+1}$ is the cross-sectional area of the tube that is down-stream (i.e., further from the pressure source) in the tube series and $A_k$ is the cross-sectional area of the tube that is upstream (i.e., closer to the pressure source) in the tube series. It should be noted that $r_k$ is bound between −1 and 1. This bounding represents scenarios where either $A_k$ or $A_{k+1}$ is infinitely larger than the next pipe adjacent to it.

Between these three equations, a single intersection between two tubes can be fully described. However, the model of example embodiments includes various tubes with multiple intersections being concatenated to form a series. To model this, these equations need to be expanded to incorporate additional tube segments and intersection. In particular, N connected tubes need to be incorporated with N−1 intersection between them. The resulting differential equation is the transfer function of the N segment tube series and when simplified is the following:

$$V(\omega) = \frac{0.5(1+r_G)\prod_{k=1}^{N}(1+r_k)e^{-LCNf\omega}}{D(\omega)} \quad (4)$$

$$D(\omega) = [1, -r_G] \begin{bmatrix} 1 & -r_1 \\ -r_1 e^{-2LCj\omega} & e^{-2LCj\omega} \end{bmatrix} \cdots \begin{bmatrix} 1 & -r_N \\ -r_N e^{-2LCj\omega} & e^{-2LCj\omega} \end{bmatrix} \begin{bmatrix} 1 \\ r_{Atm} \end{bmatrix} \quad (5)$$

Where $r_G$ is the reflection coefficient at the glottis, $r_1 \ldots r_N$ are the reflection coefficients for every consecutive tube pair in the series $r_{Atm}$ is the reflection coefficient at the mouth, L is the length of each tube, C is the speed of sound (34,300 centimeters per second), j is the imaginary constant, and ω is the frequency of the waveform in radians per second. This differential equation lacks a closed form solution such that several boundary conditions need to be specified. Specifically, the number of tubes used in the series (N) and the reflections coefficients at both the beginning ($r_G$) and the end of the series ($r_{Atm}$). This more closely binds the equation to the physical anatomy from which it is modeled.

The number of tubes necessary for the model can be determined by using the average human vocal tract length (e.g., 15.5 centimeters) and dividing by the length of each tube. This length, L, can be determined by the following equation:

$$L = \frac{TC}{2} \quad (6)$$

Where T is the time between samples in the audio recordings. For example, with a sampling rate of 16 kHz, the vocal tract model is made up of 15 distinct pipe resonators. An understanding of human anatomy can be used to fix the first reflection coefficient $r_G$ in the series, in equation (5) above. This reflection coefficient is representing the fluid reflection that occurs at the speaker's glottis. During large portions of speech (e.g., during vowels) the glottis is actively being engaged. This means that the vocal folds are actively vibrating and thus preventing fluid flow in the reverse direction. With this in mind, $r_G$ can be set to 1, symbolizing only fluid flow in the forward direction. Finally, the last reflection coefficient $r_{Atm}$ is representing the behavior of the flow at the opening of the mouth. Here again there is predominately only positive flow. This is because during speech, the vocal tract is raised to a higher than atmospheric pressure, preventing flow from moving from the atmosphere back into the vocal tract. Therefore, the last reflection coefficient $r_{Atm}$ can also be set equal to 1

Using these boundary conditions, the differential equation that describes the acoustic behavior of our concatenated tube model can be solved. Using this equation the amplitude of a certain frequency ω during a bigram for a known speaker (that has a known $r_0, \ldots r_N$ series) can be accurately estimated. As the dimensions of the speaker's vocal tract are not known, the transfer function cannot simply be applied. However, samples of the speaker's voice have been obtained such that they can be used to estimate the speaker's vocal tract during various articulations. The process of estimating a speaker's vocal tract is illustrated in FIG. 7.

The estimation is performed by running a segment of a speaker's speech through the Fast Fourier Transform (FFT) in order to obtain the relative amplitudes for the frequencies that make up their voice. The found frequency response curve is effectively the output expected from the transfer function if the speaker's $r_0, \ldots r_N$ values were known. The frequency response curve found with the FFT can be used to check if a certain $r_0, \ldots r_N$ series correctly matches the speaker. Therefore, an accurate approximation can be obtained of a speaker's vocal tract by finding a $r_0, \ldots r_N$ series that accurately reproduces the speaker's frequency response curve.

To avoid naively searching the entire $r_0, \ldots r_N$ space for a match, an error function can be constructed that can be optimized with gradient descent to find a good solution. Since gradient descent searches for a local minimum, the outputs from the transfer function are subtracted from the frequency response curve found using the FFT. The transfer function is initially run with all reflections coefficients $r_0, \ldots r_N$ set to zero. This is analogous to constant diameter tube which is a configuration known to be achievable by the human vocal tract. The resulting curve is then integrated to find the overall error between the two curves. As the output of the transfer function approaches the frequency response curve, the area between the two curves will approach zero and result in a local minima. At this point, the $r_0, \ldots r_N$ values used in the transfer function should approximate the speaker's vocal tract during that bigram.

Once the optimal series of reflection coefficients have been found, they can be converted into cross-sectional area estimates using Equation 3. This step requires one last assumption about the vocal tract since there is one more cross-sectional area measurement than there are reflection coefficients (i.e., N–1 tube intersections). To mitigate this, the cross-sectional area at the glottis is set to the average size of a human glottis of 3.7 $cm^2$. With this assumption the cross-sectional area series $\alpha_0, \ldots, \alpha_N$ can be calculated that closely approximate the human vocal tract.

Deep-Fake Audio Detector

Using the vocal tract estimator a generalized detector for deep-fake audio can be designed. The detector of example embodiments described herein functions in two phases. During the first phase it extracts and selects the ideal set of features that differentiate organic and deep-fake speech. In the second phase, the detector will use these ideal features to classify whole samples of audio as either deep-fake or organic.

The ideal feature selection phase begins with the detector ingesting known deep-fake and organic audio samples. These audio samples also have associated metadata containing timestamps for both the words and individual phonemes that make up the sample. The phoneme metadata is then augmented to create the necessary bigram timing information. For this, phonemes are defined that are considered to be adjacent to one another. Two phonemes are defined as being adjacent if they are both in the same word and occur one after the other. For example, the word cat (phonetically spelled "/kæt/") contains two bigram pairs, "/k-æ/" and "/æ-t/". A bigram is considered to begin at the start of the first phoneme and stop at the end of the second phoneme. The found bigram timing information will later be associated to estimate features found from processing the audio.

Each audio sample is divided using a sliding window of 565 samples with an overlap between windows of 115 samples. These values were found experimentally and were selected so that on average each bigram would span between three to seven windows. However, these values are not limiting. The selected values ensured capture of the temporal behavior of the majority bigram. Every windowed segment of audio is then passed through the vocal tract estimator and assigned a feature vector of 15 cross-sectional areas. Each windowed segment is then associated in time to a given word and bigram using the meta data described previously.

Bigrams and features can now be determined that best differentiate organic and deep-fake audio. This is done by finding divergences in the distributions of features in specific bigrams between deep-fake and organic audios. These divergences come about because of how the biological framework of the vocal tract affects speech, whereas GAN-generated audio is not constructed with human anatomy in mind. This divergence is used in distributions to distinguish deep-fake audio samples from organic ones. The greater the divergence, the stronger the indication. For example, consider feature 0 for "/aI-m/" (bigram). If the values for this feature are orders of magnitude higher/lower for an organic audio sample than that of a deep-fake audio sample, then this bigram-feature pair is an ideal discriminator. Therefore, choosing the correct features to use for discrimination is very important. The efficacy of a detection algorithm is directly tied to the features it employs.

According to the present disclosure, all bigram-feature pairs might not act as ideal discriminators. Firstly, deep-fake audio models might be accidentally learning the correct distribution for some of the bigram-feature values. This scenario is likely possible—after all, these models do produce high quality 'human-like' audio. Secondly, two different deep-fake audio models might produce two completely different sets of bigram-features that do not resemble organic audio.

To determine the ideal bigram-feature pairs that act as good discriminators, their probability density function (PDF) graphs are plotted as illustrated in FIG. 8. The PDF represents the likelihood of the random variable having a certain value. In this case, the random variable is the feature-bigram pair. If there is a large overlap between the PDF curves for an organic and deep-fake audio as is the case in plot (a) of FIG. 8, then that feature is a poor discriminator. This means that the model has learned the correct distribution of the bigram-feature pair. In contrast, if there is little to no overlap between the PDF curves as shown in plot (b) of FIG. 8, then that feature-bigram pair is an ideal discriminator (i.e., can be used to help identify, the outputs of which are deep-fake audio from organic ones.

The set of ideal features includes bigram-feature pairs that can differentiate between deep-fake and organic audio samples with a precision-recall of at least 0.9. This is performed by using different values of the bigram-feature pairs, until one is obtained (the threshold k) that achieves the desired precision-recall values. This results in a triplet bigram-feature-threshold that we refer to as our ideal feature set.

The second phase of the detector is used to determine whether whole audio samples were GAN generated or organically generated. This phase begin in a similar manner to the ideal feature selection phase described in the previous section. This phase begins by creating the necessary bigram timing information from the sample's metadata. Next, it windows and evaluates the audio samples using the vocal tract estimator. Finally, it associates the estimated vocal tract features to specific bigrams and words just as in the ideal feature selection phase. At this point, the whole sample detection phase deviates from the ideal feature selection phase.

Instead of searching for the ideal features to extract, this phase checks the previously determined set of ideal features against the labeled vocal tract features for this sample. More specifically, every feature is extracted from the sample that exists in both itself and the ideal feature set. For every one of these features, the previously found threshold from the ideal feature set is compared with the value found in the current sample. The number of times the values from the test audio samples cross the threshold are counted. If there are more bigram-feature values that cross the threshold than do not, the audio sample is labeled as a deep-fake.

Datasets

According to example embodiments provided herein, different datasets may be used to test against the modeling technique described herein as well as the process that was performed in generating deep-fakes. For the development of the transfer function, we use the TIMIT (Texas Instruments and Massachusetts Institute of Technology) dataset as it is the standard in acoustic-phonetic studies and is hand verified by the National Institute of Standard and Technology (NIST).

The TIMIT dataset is a corpus of read speech that is used in phonetic studies and is designed to help in the development of speech recognition systems. TIMIT provides documentation of the time alignments for the phonemes and words in each audio file, which is information that is essential for developing our modeling process. The TIMIT dataset is comprised of 630 speakers of 8 different American English dialects split between a train and test set. For example embodiments provided herein of organic audio, a randomly selected subset of TIMIT was used comprised of 49 speakers which is approximately 10% of the TIMIT training set. The size of the subset was limited due to computational time constraints of the vocal tract modeling. Each TIMIT speaker has 10 recorded sentences, which were split into a training and evaluation set for optimizing the technique described herein. Seven of the sentences were randomly sampled for the training set and the remaining three sentences were used in the evaluation set.

For consistency purposes, time-alignments were performed using an open-source forced aligner which time-aligned both words and phonemes based at least in part on a given transcription. The forced aligner was built on a toolkit frequently used for automatic speech recognition. Any audio samples that are used, other than the TIMIT dataset, need their own time-alignment that have to be computed locally. By performing time-alignments on the TIMIT dataset, any error in alignments can be kept consistent across all samples.

For the deep-fake audio samples, an open-source voice-cloning tool was used and a set of synthetic TIMIT audio samples were derived. A simple model was trained on approximately 30 seconds of audio (i.e., the concatenation of all 10 TIMIT audio samples) for each of the 49 speakers in the subset. The goal of this dataset is to generate deep-fake samples based at least in part on the TIMIT speakers saying the identical phrases they spoke organically. These models generate deep-fakes better with longer sentences; therefore 100 audio samples were sampled with phrases of at least 10 words per sentence to replicate. For each audio sample, the model trained for that speaker was used to generate the same phrase spoken in the sample. This makes each of the generated audio sample a deep-fake for that targeted speaker and the fake audio phrases the same as those of the organic speaker. These samples covered 44 of the 49 speakers, each speaking 42 unique bigrams on average. Similarly to the organic audio, a time-alignment forced aligner was used on these deep-fake samples to retrieve the phonetic time-alignments.

For the purposes of evaluating and testing the techniques described herein, a combination of both the organic and deep-fake TIMIT samples were divided into a testing set and an evaluation set. Both sets were selected so that all the speakers within the dataset had both organic and deep-fake audio samples. Finally, both sets we selected so that they did not share any speakers between them. This was done so that testing maintains generalizability and the ability to detect deep-fake samples even without having access to samples of the original speaker.

Evaluation

To determine the ideal bigram-feature pairs, data was randomly sampled from a set of organic and deep-fake audio samples to produce two data sets: evaluation and testing. The evaluation set is used to determine the ideal bigram-feature pairs and their corresponding thresholds using the ideal feature extractor. The efficacy of the technique is then evaluated on a testing set. Additionally, the evaluation and testing sets do not have overlapping speakers. This captures the stronger threat model as we do not have any information of the speaker who will be impersonated.

The evaluation set contained 148 audio files from 19 speakers, which contain a total of 357 bigrams. Of these, 74 audio files from 9 speakers are deep-fake samples and 74 audio files from 10 speakers are organic. The testing set consists of 330 audio files from 75 speakers. Of these, 74 audio files from 36 speakers (2 sentences per speaker) are deep-fake samples and 273 audio files from 39 speakers (7 sentences per speaker) are organic. It is important to note that the test set is twice as large as the evaluation set. This was done to evaluate whether the technique generalizes well to a larger test set. This is in contrast to existing ML detection mechanisms, which require orders of magnitude more evaluation data than test data to generalize well.

Before evaluating the performance of the detector, the ideal feature set needs to be found using the process described above. The evaluation was used to find the set of ideal features that consisted of 179 bigram-feature-threshold triples. To evaluate the performance of the detector, all the audio samples in the testing dataset were classified. To do this, all the sentences for each speaker were concatenated together to form a single audio sample which was approximately 2 sentences per speaker for deep-fakes and 7 sentences per speaker for organic. Then, each audio sample was run through the whole sample detection phase outlined above. Overall, 12,103 bigram-features pairs were extracted and compared to the values found in the ideal feature set. Finally, the detector was able to achieve a 100% precision, a 97.3% recall, and false positive rate of 0% using the ideal feature set.

Bigram Frequency Analysis

The 179 bigram-feature pairs of the ideal feature came from 67 distinct bigrams that had on average 2.7 features within the set. These bigrams made up approximately 10% of the 683 bigrams present in the TIMIT dataset tested. Since TIMIT is a phonetically balanced dataset, it accurately represents the distribution of phoneme in spoken English. FIG. 9 shows the 50 most common bigrams in the TIMIT dataset and all 67 bigrams in the ideal features set. While most of the bigrams in the ideal feature set are not in the top 50 bigrams, they still roughly make up 10% of the total bigrams extracted from the testing set. This implies that even though the ideal features are not the most common bigrams, they still make up a sizable portion of the speech. This makes selecting a phrase that does not contain multiple occurrences of bigrams in the ideal feature set difficult for longer phrases, especially when considering that most words are made up of multiple bigrams. It is highly likely that an English sentence will contain some bigrams that are a part of the ideal feature set.

With this understanding, the likelihood that a sentence will be misclassified by the detector is explored. FIG. 10 shows the PDF and histogram of the percentage of features labeled deep-fake for every sentence in the dataset. This shows that most features evaluated in deep-fakes samples are individually labeled as a deep-fake. This means that the deep-fakes classification is not being determined by a few features each time. This implies that the model's performance would need to increase by a considerable margin before they could trivially beat the detector described herein.

Fundamental Phenomena Confirmation

In order to observe the fundamental difference between deep-fakes and organic audio the detector disclosed herein is based around, a deep divide is conducted on a single phoneme ("/d-ou/", pronounced doh) into better observer the incorrect behavior of the vocal tract estimates found for deep-fake audio. FIG. 11 illustrates the estimated cross-sectional area for one of the bigrams from the ideal feature set. For reference, a different part of the TIMIT dataset is used to create a secondary set labeled TIMIT Test that has not been previously used. The box plots (a) represent the estimated cross-sectional area found by our estimator described above. The dimensions represent the multiple tubes the transfer function used to estimate the vocal tract with, as previously seen in FIG. 5. These cross-sectional area estimates were then converted to their approximate diameters (b). It is clear at this point the deep-fake audio is not behaving a manner that is similar to the organically spoken data. The final segment of this figure (c) shows that the data from the deep-fake's vocal tract estimate models a vocal tract approximately the size and shape of a drinking straw. The cross-sectional area estimates of (a) and diameters in (b) may be used to evaluate the correlation between two sounds. The divergence between the cross-sectional area estimates and/or diameters may be used to distinguish between different speakers of a sound, or establish if an audio sample was organically generated or digitally constructed. A threshold may be established above which two audio samples are determined to come from the same speaker, while below this threshold there may be too much divergence between the audio samples to correlate the two or establish them as coming from the same speaker. This threshold or predefined measure may be, for example, a degree of overlap of the cross-sectional area estimates and/or the diameters. If the cross-sectional area estimates and/or diameters for a particular audio sample overlap within a predefined measure (e.g., 90%) of each other, the audio samples may be established as coming from the same speaker. Further, below 90% there may be an area of uncertainty, where the similarity is not sufficient to determine with certainty that the sounds came from the same speaker, but there is sufficient similarity that it cannot be definitively determined that the audio samples did not come from the same speaker or that one was artificially produced. Similarities between 70% and 90% of overlap may fall into this area of uncertainty, while similarities or a degree of overlap below 70% may provide a strong indication that the audio samples are from different speakers.

Constraints

While the disclosed embodiments of acoustic modeling can process all phonemes for a given speech sample, the pipe series are generally only anatomically correct for the vocal tract while the speaker is producing a vowel sound. This means that the technique is less accurate when processing non-vowel phonemes. However, vowels make up 38% of all phonemes such that most bigrams will contain at least one vowel phoneme. Therefore, the use of bigrams also minimizes the number of processed samples that the modeling technique is in appropriate for.

During the preprocessing stage of the pipeline, a method is employed to automatically timestamp the audio files according to their words and phonemes. The method may require sample transcriptions, which can be generated using an application programming interface (API), such as the Google Speech API. Thus, the accuracy of the timestamps and the following stages of the pipeline may be tied to the accuracy of the method of timestamping the audio files. While some phonemes are only a few milliseconds long, the methods described herein may have precision to the nearest hundredth of a second, such that timestamps for short phonemes may be overestimated, which may introduce rounding errors. The use of bigrams helps mitigate this issue since using pairs provides a greater target length for the timestamp precision level. The noisiness of synthetically generated audio can cause mis-transcription in the Google Speech API. However, the mis-transcriptions may be phonetically similar to the correct transcription, such that timestamps may contain little error. This limits any substantial impact that a mis-transcription could have on the results described herein.

Embodiments provided herein are optimized to have a 100% precision rate resulting in a minor decrease in recall to 97.3%. A high precision rate ensures that a deep-fake audio sample is not accidentally labeled as organic by embodiments described herein. This balance of precision to recall is specifically designed to protect the victim of a deep-fake attack. It is far more dangerous for a deep-fake audio to be believed as real, than the converse.

Embodiments of the present disclosure do not require large training data sets of thousands of audio samples as required with the use of Deep Neural Nets (DNNs) for identifying deep-fake audio. Such large training data sets are a substantial hinderance as generating large amounts of deep-fake audio data is not a simple task. If the training data is not large enough to capture the full distribution, the trained DNN will fail to generalize. As a result, the DNN will perform poorly on the test set. Methods described herein require only a few dozen audio samples, and can generalize to a much larger test set. Since DNNs are black-boxes, they do not provide explanations for the predicted labels. On the other hand, methods described herein leverage the deep understanding of the human anatomy to explain the predicted labels.

Deep-fake audio generators can enable attackers to impersonate any person of their choosing. Existing techniques to detect deep-fake audio often require knowledge of the specific generator. Embodiments of the present disclosure provide a detection mechanism that is independent of any generator. These methods leverage the knowledge of the human anatomy, fluid dynamics, and the articulatory system to detect deep-fake audio samples with a precision of 100% and a recall of 97.3%. In doing so, embodiments of the present disclosure present a unique lens to view the problem of deep-fake detection—one that is explainable, generalizable, and free of the limitations of other ML based approaches FIG. 12 illustrates a flowchart depicting methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present disclosure and executed by a processor of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 12 illustrates a flowchart of a method according to an example embodiment of the present disclosure for identifying deep-fake audio samples. According to the illustrated embodiment, a model of a vocal tract is generated at 202 based at least in part on frequency response of one or more organic audio samples from a user. A set of bigram-feature pairs from the one or more audio samples from the user are identified at 204. The cross-sectional area of the vocal tract of the user when speaking the set of bigram-feature pairs is estimated at 205 from the generated model of the vocal tract. A candidate audio sample is received at 208. Bigram-feature pairs of the candidate audio sample that are in the set of bigram-feature pairs are identified at 210. A cross-sectional area of a theoretical vocal tract of a user when speaking the identified bigram-feature pairs of the candidate audio sample is calculated at 212. The candidate audio sample is identified as a deep-fake audio sample at 214 in response to the calculated cross-sectional area of the theoretical vocal tract of a user when speaking the identified bigram-feature pairs of the candidate audio sample failing to correspond within a predefined measure of the estimated cross-sectional area of the vocal tract of the user when speaking the bigram-feature pairs.

In an example embodiment, an apparatus for performing the methods of FIG. 12 above may include a processor configured to perform some or each of the operations (202-214) described above. The processor may, for example, be configured to perform the operations (202-214) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 202-214 may comprise, for example, the processor and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
    generate a model of a vocal tract based at least in part on frequency response of one or more organic audio samples from a user;
    identify a set of bigram-feature pairs from the one or more organic audio samples;
    estimate, from the generated model of the vocal tract, the cross-sectional area of the vocal tract of the user when speaking the set of bigram-feature pairs;
    receive a candidate audio sample;
    identify bigram-feature pairs of the candidate audio sample that are in the set of bigram-feature pairs;
    calculate a cross-sectional area of a theoretical vocal tract of a user when speaking the identified bigram-feature pairs of the candidate audio sample; and
    identify the candidate audio sample as a deep-fake audio sample in response to the calculated cross-sectional area of the theoretical vocal tract of a user when speaking the identified bigram-feature pairs of the candidate audio sample failing to correspond within a predefined measure of the estimated cross-sectional area of the vocal tract of the user when speaking the set of bigram-feature pairs.

2. The apparatus of claim 1, wherein the apparatus is further caused to:
identify the candidate audio sample as an organic audio sample in response to the calculated cross-sectional area of the theoretical vocal tract of a user when speaking the identified bigram-feature pairs of the candidate audio sample corresponding within a predefined measure of the estimated cross-sectional area of the vocal tract of the user when speaking the set of bigram-feature pairs.

3. The apparatus of claim 1, wherein causing the apparatus to identify a set of bigram-feature pairs from the one or more audio samples comprises causing the apparatus to identify bigram-feature pairs based, at least in part, on an estimation of the cross-sectional area of a vocal tract of a user when speaking respective bigram-feature pairs.

4. The apparatus of claim 1, wherein causing the apparatus to identify a set of bigram-feature pairs from the one or more audio samples comprises causing the apparatus to identify a set of bigram-feature pairs based, at least in part, on divergences in distributions of features in specific bigrams between deep-fake audio and organic audio.

5. The apparatus of claim 4, wherein divergences in distributions of features in specific bigrams between deep-fake audio and organic audio are established based at least in part on a degree of overlap between probability density function graphs of the specific bigrams for deep-fake audio samples and organic audio samples.

6. The apparatus of claim 1, wherein causing the apparatus to generate the model of the vocal tract based at least in part on frequency response of one or more organic audio samples from a user comprises causing the apparatus to:
process the one or more organic audio samples through a Fast Fourier Transform to obtain relative amplitudes for frequencies of a voice of the user.

7. The apparatus of claim 1, wherein causing the apparatus to identify the candidate audio sample as a deep-fake audio sample further comprises causing the apparatus to:
provide an explanation of how the candidate audio sample was identified as a deep-fake audio sample.

8. A method comprising:
generating a model of a vocal tract based at least in part on frequency response of one or more organic audio samples from a user;
identifying a set of bigram-feature pairs from the one or more organic audio samples;
estimating, from the generated model of the vocal tract, the cross-sectional area of the vocal tract of the user when speaking the set of bigram-feature pairs;
receiving a candidate audio sample;
identifying bigram-feature pairs of the candidate audio sample that are in the set of bigram-feature pairs;
calculating a cross-sectional area of a theoretical vocal tract of a user when speaking the identified bigram-feature pairs of the candidate audio sample; and
identifying the candidate audio sample as a deep-fake audio sample in response to the calculated cross-sectional area of the theoretical vocal tract of a user when speaking the identified bigram-feature pairs of the candidate audio sample failing to correspond within a predefined measure of the estimated cross-sectional area of the vocal tract of the user when speaking the set of bigram-feature pairs.

9. The method of claim 8, further comprising:
identifying the candidate audio sample as an organic audio sample in response to the calculated cross-sectional area of the theoretical vocal tract of a user when speaking the identified bigram-feature pairs of the candidate audio sample corresponding within a predefined measure of the estimated cross-sectional area of the vocal tract of the user when speaking the set of bigram-feature pairs.

10. The method of claim 8, wherein identifying a set of bigram-feature pairs from the one or more audio samples comprises identifying bigram-feature pairs based, at least in part, on an estimation of the cross-sectional area of a vocal tract of a user when speaking respective bigram-feature pairs.

11. The method of claim 8, wherein identifying a set of bigram-feature pairs from the one or more audio samples comprises identifying a set of bigram-feature pairs based, at least in part, on divergences in distributions of features in specific bigrams between deep-fake audio and organic audio.

12. The method of claim 11, wherein divergences in distributions of features in specific bigrams between deep-fake audio and organic audio are established based at least in part on a degree of overlap between probability density function graphs of the specific bigrams for deep-fake audio samples and organic audio samples.

13. The method of claim 8, wherein generating the model of the vocal tract based at least in part on frequency response of one or more organic audio samples from a user comprises:
processing the one or more organic audio samples through a Fast Fourier Transform to obtain relative amplitudes for frequencies of a voice of the user.

14. The method of claim 8, wherein identifying the candidate audio sample as a deep-fake audio sample further comprises:
providing an explanation of how the candidate audio sample was identified as a deep-fake audio sample.

15. A computer program product comprising at least one non-transitory computer-readable storage medium having computer-executable program code portions stored therein, the computer-executable program code portions comprising program code instructions configured to:
generate a model of a vocal tract based at least in part on frequency response of one or more organic audio samples from a user;
identify a set of bigram-feature pairs from the one or more organic audio samples;
estimate, from the generated model of the vocal tract, the cross-sectional area of the vocal tract of the user when speaking the set of bigram-feature pairs;
receive a candidate audio sample;
identify bigram-feature pairs of the candidate audio sample that are in the set of bigram-feature pairs;
calculate a cross-sectional area of a theoretical vocal tract of a user when speaking the identified bigram-feature pairs of the candidate audio sample; and
identify the candidate audio sample as a deep-fake audio sample in response to the calculated cross-sectional area of the theoretical vocal tract of a user when speaking the identified bigram-feature pairs of the candidate audio sample failing to correspond within a predefined measure of the estimated cross-sectional area of the vocal tract of the user when speaking the set of bigram-feature pairs.

16. The computer program product of claim 15, further comprising program code instructions to:
identify the candidate audio sample as an organic audio sample in response to the calculated cross-sectional area of the theoretical vocal tract of a user when speaking the identified bigram-feature pairs of the candidate audio sample corresponding within a predefined measure of the estimated cross-sectional area of the vocal tract of the user when speaking the set of bigram-feature pairs.

17. The computer program product of claim 15, wherein the program code instructions to identify a set of bigram-feature pairs from the one or more audio samples comprise program code instructions to identify bigram-feature pairs based, at least in part, on an estimation of the cross-sectional area of a vocal tract of a user when speaking respective bigram-feature pairs.

18. The computer program product of claim 15, wherein the program code instructions to identify a set of bigram-feature pairs from the one or more audio samples comprise program code instructions to identify a set of bigram-feature pairs based, at least in part, on divergences in distributions of features in specific bigrams between deep-fake audio and organic audio.

19. The computer program product of claim 18, wherein divergences in distributions of features in specific bigrams between deep-fake audio and organic audio are established based at least in part on a degree of overlap between probability density function graphs of the specific bigrams for deep-fake audio samples and organic audio samples.

20. The computer program product of claim 15, wherein the program code instructions to identify the candidate audio sample as a deep-fake audio sample further comprise program code instructions to:
provide an explanation of how the candidate audio sample was identified as a deep-fake audio sample.

* * * * *